3,349,799
ROTARY PLUG VALVE
Frank H. Mueller and William L. Hauffe, Decatur, Ill., assignors to Mueller Co., Decatur, Ill., a corporation of Illinois
Filed Apr. 20, 1965, Ser. No. 449,498
36 Claims. (Cl. 137—625.22)

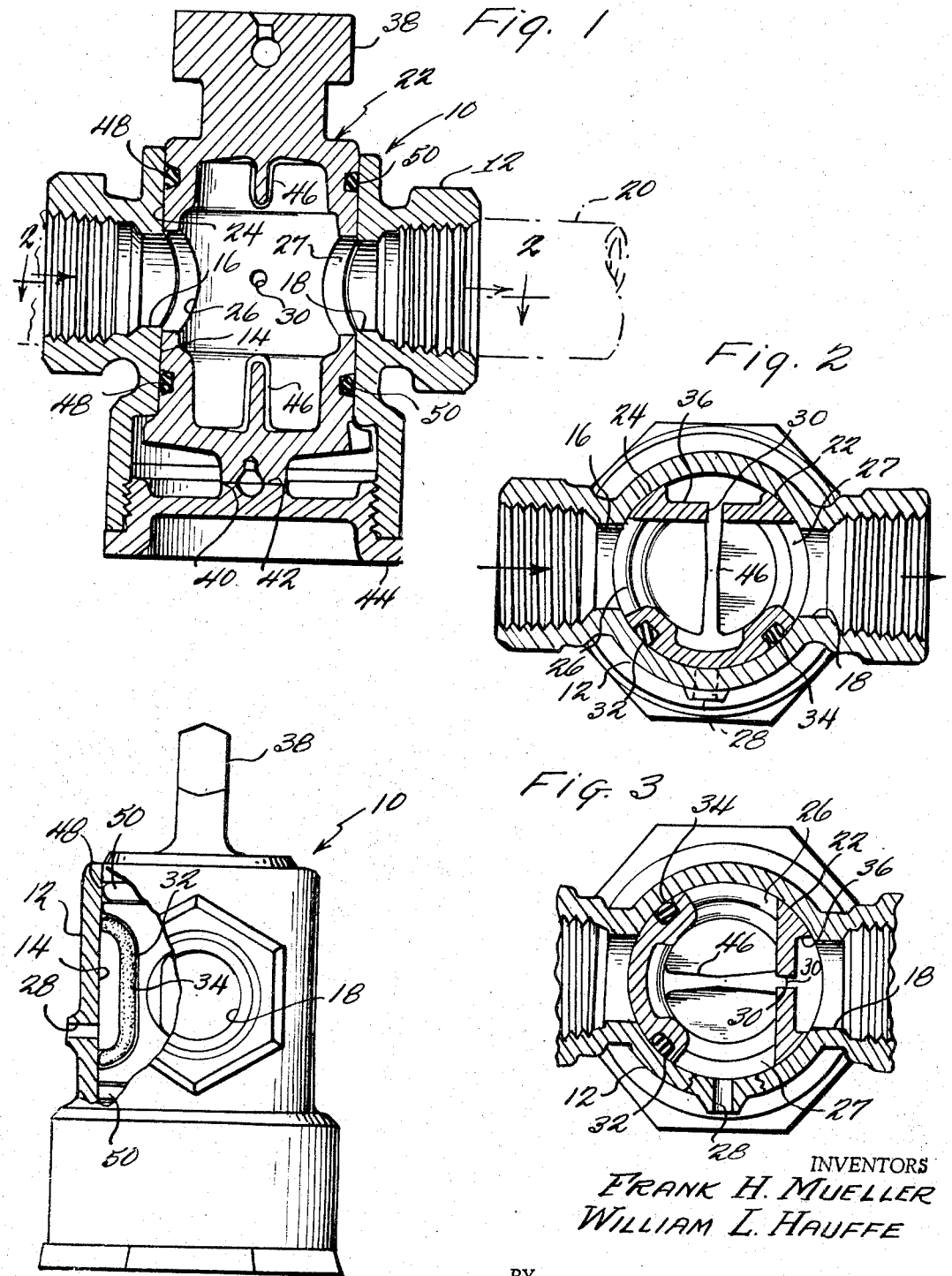

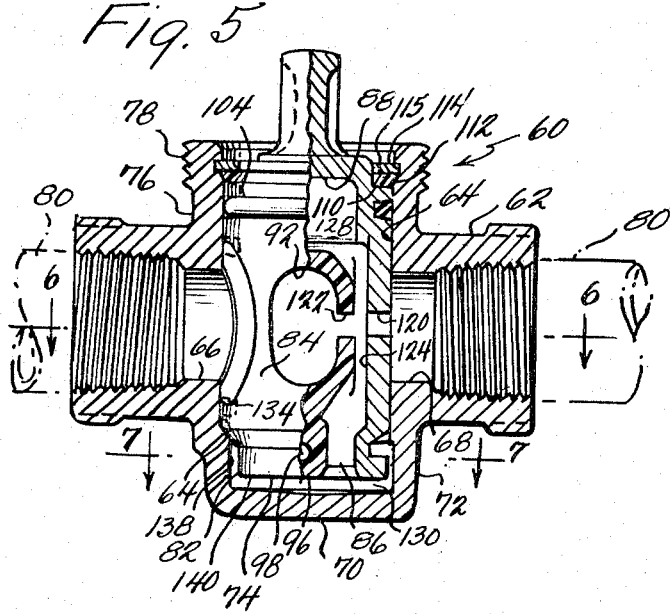

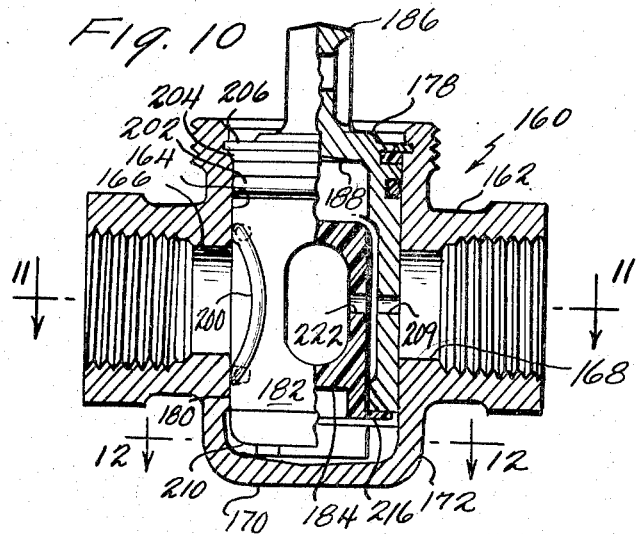
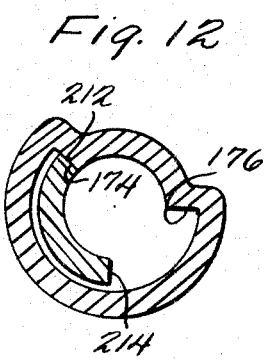
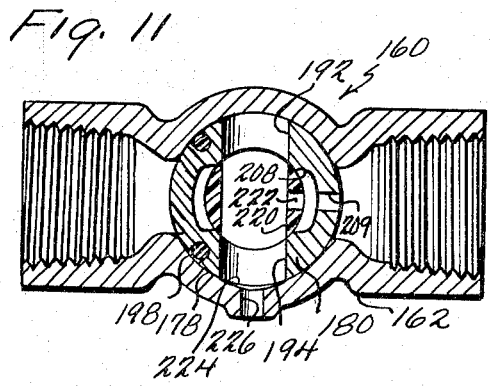
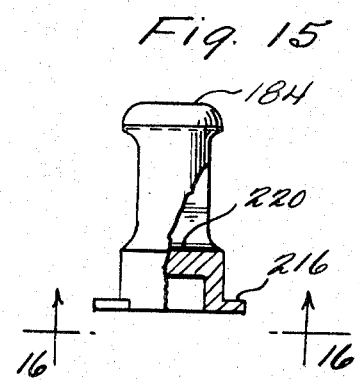
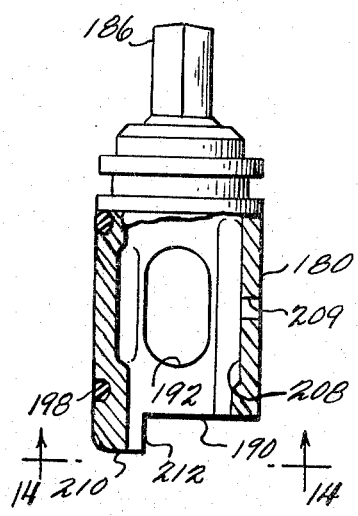
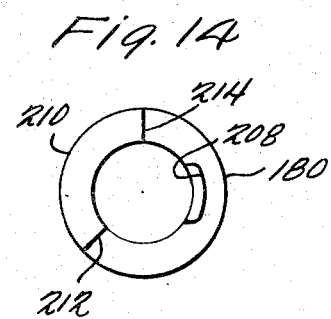
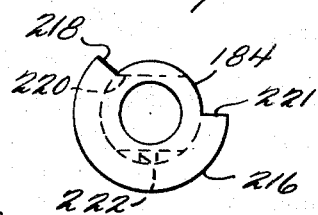
INVENTORS
FRANK H. MUELLER
WILLIAM I. HAUFFE
BY Cushman, Darby & Cushman
ATTORNEYS

United States Patent Office 3,349,799
Patented Oct. 31, 1967

ABSTRACT OF THE DISCLOSURE

A rotary plug valve having a cylindrical shaped plug member rotatable a quarter of a turn between an open and closed position, the plug member comprising a hollow outer shell with a plastic insert therein, the shell and insert having a flow passage therethrough, the plug valve further incorporating a drain for draining the downstream side of the same when the valve is closed, the valve further having plug retaining and sealing means to prevent the ingress of fluids and abrasive materials from outside of the valve housing.

---

The present invention relates to improvements in rotary plug valves and, more particularly, to those rotary plug valves of the type having a drain therein for draining the downstream side of the plug valve when the plug valve is closed.

While the present invention relates to a rotary plug valve of the type shown in United States Patent No. 3,066,908, issued Dec. 4, 1962 to Carl E. Floren and is an improvement thereof, it will be realized that many of the features of the present invention are applicable to other types of rotary plug valves with or without drains. The plug valve disclosed in the aforementioned patent was of the type having a cylindrical valve seat provided with an endless groove surrounding the seat outlet port, and an O-ring disposed in such groove for sealing engagement with the plug surface when the plug was in the closed position. While the aforedescribed valve has proved satisfactory for its intended purposes, it is still subject to being improved, especially when the valve is provided with a drain for draining the downstream side of the same when the valve is in closed position. Also, such an aforedescribed valve, when of the closed-bottom type, was unbalanced i.e., the net pressure force acting on the valve plug by fluid passing through the valve tended to urge the valve plug axially, thus necessitating providing a seal and plug restraining means between the valve plug and the valve seat adjacent the opening in the housing member of the valve. Novel improvements to the seal and the means for preventing the valve plug member moving axially relative the valve housing member and functioning to provide an additional seal against ingress of fluids and abrasive materials from outside the valve housing are part of the present invention.

An object of the present invention is to provide an improved rotary plug valve having a drain therein for draining the downstream side thereof, the valve being provided with an endless sealing ring carried by the valve plug member in a seat groove and arranged to surround the inlet port in the valve seat when the valve is closed.

Ancillary to the above object, it is a further object of the present invention to provide a rotary plug valve wherein the endless sealing ring carried in a seat groove in the plug member additionally functions to surround the drain port in the housing member of the valve when the valve is in the open position whereby ingress of fluid and abrasive material is prevented from flowing into the drain port and seeping about the plug member and the valve seat.

Another object of the present invention is to provide a rotary plug valve provided with an endless sealing ring carried in a seat groove in the plug member which is arranged to surround a drain port in the housing of the valve when the valve is in an open position, the endless sealing ring being subjected to line pressure around the same and atmosphere pressure within the same, the pressure differential distorting the sealing ring to improve its sealing characteristics.

A further object of the present invention is to provide an improved type of rotary plug valve having the drain port in the housing member of the same, the valve having means therein for applying momentarily full line pressure to the drain port when the valve is being moved from the open to the closed position so that line pressure serves to vigorously flush and blow out any debris or foreign material which may have been packed into the housing drain port.

Another object of the present invention is to provide a rotary plug valve with a drain, the rotary plug valve having an O-ring carrier in a seat groove on the plug member's plane surface for cooperation with the inlet port in the valve seat as well as the drain port in the housing member, the line pressure tending to maintain the O-ring in the groove during movement of the plug member rather than blowing the ring out of the groove as in the case where the groove is provided in the valve seat around the inlet port or as in the case where the groove is provided in the rotary plug around the outlet port.

Still another object of the present invention is to provide a rotary plug valve having its plug member made in the form of a hollow cast shell and having means therein to provide for a smooth flow of fluid therethrough thereby reducing the pressure loss characteristics across the valve.

A further object of the present invention is to provide an improved rotary plug valve having a plug member which is made from a hollow cast shell open at one end and having a plastic plug insert therein so as to define an uninterrupted flow passage therethrough. Ancillary to the above it is a further object of the present invention to make the flow passage through the plug valve elongated in an axial direction of the plug whereby the plug member can be made of less material and less diameter than heretofore accomplished.

It is another object of the present invention to provide an improved rotary plug valve of the unbalanced type having means for preventing axial movement of the plug member relative the housing member which also functions when line pressure is applied to the plug member as a seal to prevent ingress of fluids and abrasive material or the like from exteriorly of the housing member.

Still a further object of the present invention is to provide a rotary plug valve of the type having a plug member made from a hollow cast shell with a plastic insert therein to define an uninterrupted and smooth flow passage therethrough, the valve having means to apply line pressure exteriorly of the ends of the plastic insert when the valve is being opened or is open so as to balance the pressure on the walls of the plastic insert from within and without the same.

A further object of the present invention is to provide a rotary plug valve having a drain therein for draining the downstream side thereof, the plug member being provided with a lug thereon operating between stops which enables limited rotational movement between full open and full closed position and also permits the plug member to be inserted in the housing member in only the proper quadrant.

Ancillary to the immediately preceding object, it is another object of the present invention to make the plug member in two parts, namely, a hollow cast shell made by coring alone without the use of green sand so as to eliminate all fins from the check lug area, and a plastic insert fitting into the shell and having a fin molded integrally thereon for mating with the check lug on the shell so as to accurately align the passage of the insert with the port openings in the shell.

It is a further object of the present invention to provide an improved rotary plug valve of simple and inexpensive construction with is extremely effective for its intended purposes.

These and other objects and advantages of the present invention will become more apparent from the following specification, claims and accompanying drawings, in which:

FIGURE 1 is a vertical sectional view illustrating a rotary plug valve embodying the present invention, the value being shown in its open position;

FIGURE 2 is a sectional view taken on the line 2—2 of FIGURE 1, the valve plug member being shown in the open position;

FIGURE 3 is a fragmentary sectional view similar to FIGURE 2 but illustrating the plug member of the rotary plug valve in the closed position;

FIGURE 4 is a side elevational view of the rotary plug valve of FIGURE 1 looking from the right hand side of FIGURE 1, the view being partially broken away and partially in section for purposes of clarity;

FIGURE 5 is a vertical sectional view partly in elevation and partly broken away but illustrating a modified form of a valve embodying the present invention, the valve being shown in its closed position.

FIGURE 6 is a sectional view of the plug valve of FIGURE 5 taken on the line 6—6 thereof;

FIGURE 7 is a sectional view of the rotary plug valve of FIGURE 5 taken on the line 7—7 of FIGURE 5;

FIGURE 8 is a side elevational view looking from the right of FIGURE 5, the view being partially broken away and in section for purposes of clarity;

FIGURE 9 is an elevational view partly in section and illustrating the plug member of the valve disclosed in FIGURE 5;

FIGURE 10 is a vertical sectional view partly in elevation and partly broken away but illustrating a further preferred modified form of valve embodying the present invention, the valve being shown in its closed position;

FIGURE 11 is a sectional view of the plug valve of FIGURE 10 taken on the line 11—11 thereof;

FIGURE 12 is a sectional view of the plug valve of FIGURE 10 taken on the line 12—12 thereof;

FIGURE 13 is an elevational view, partly broken away, and illustrating the shell of the plug member for the valve of FIGURE 10;

FIGURE 14 is an end view taken on the line 14—14 of FIGURE 13;

FIGURE 15 is an elevational view, partly broken away, of the insert for the shell of the plug valve of FIGURE 10; and FIGURE 16 is an end view taken on the line 16—16 of FIGURE 15.

Referring now to the drawings wherein like character or reference numerals represent like or similar parts and in particular to FIGURES 1–4, inclusive, there is shown a rotary plug valve 10 having a housing member 12 provided with a cylindrical valve seat 14 of uniform diameter having diametrically opposed inlet and outlet ports 16 and 18, respectively. The inlet and outlet ports 16 and 18 are preferably interiorly threaded at their outer ends for connecting the valve 10 in a fluid line 20 such as a water line to a dwelling. Rotatably mounted in the valve seat 14 of the housing member 12 isa valve plug member generally designated at 22 and having an exterior cylindrical surface 24 of uniform slightly smaller diameter than that of the valve seat 14 and coextensive therewith. The plug member 22 is formed of a hollow shell, as shown, having diametrically opposed inlet and outlet port openings 26 and 27, respectively, defining a flow passage therethrough, the port openings 26 and 27 being adapted to register with the seat ports 16 and 18 respectively when the valve is in the open position.

The rotary plug valve 10 shown in the drawing is intended primarily for use as a water curb stop, although it will be understood that the rotary plug valve of the present invention is also capable of other uses and in other types of fluid lines.

When used as a water curb stop, many of the water utility companies desire to equip such a rotary plug valve 10 with a drain which will not only drain the interior of the valve but also the downstream side of the line when the valve is in the closed position. In order to provide for draining of the valve 10 and the downstream side line 20, the valve housing member 12 is provided with a drain port 28 through a wall thereof intermeditae the inlet and outlet ports 16 and 18. Also, the plug member 22 is provided with a drain port 30 through the walls thereof intermediate the port openings 26 and 27, the drain port 30 communicating with the flow passage within the shell of the plug member 22. As shown in FIGURE 2, the plug member 22 is in a position where its ports 26 and 27 are in register with the ports 16 and 18 respectively of the housing member 12, thus providing for through flow of liquid through the valve. The drain port 30, when the plug member 22 is in the open position, merely faces the valve seat 14 whereas the drain port 28 in the housing member is closed off by the wall of the plug member 22. In FIGURE 3, the plug member 22 is illustrated rotated 90° from the position shown in FIGURE 2 and the valve is thus in a closed position as the port openings 26 and 27 of the plug member are out of registry with the inlet and outlet ports 16 and 18 of the housing member 12. Drain port 28 is in registry with the outlet port opening 27 in plug member 22 whereas drain port 30 in the plug member is in registry with the outlet port 18 in the housing member 12. Thus, any water on the downstream side of the valve 10 and any water within the valve can drain through the ports 30 and 28 to the exterior of the valve.

An endless groove 32 of uniform depth is provided on the exterior cylindrical surface 24 of the plug member 22 intermediate the port openings 26 and 27, the groove being arranged on the opposite side of the plug member from the side having the drain port 30 therein. An O-ring 34 is disposed within the groove 32 for sealing engagement with the opposed surface of the valve seat 14. As clearly shown in FIGURES 2 and 4, the O-ring 34 provides a seal completely around the drain port 28 when the valve 10 is in the open position and this prevents surface water, abrasive material, grit or the like from entering into the valve through the drain port 28 and seeping between the valve seat 14 and the plug member 22 where it could possibly damage seals of the valve or make the operation of the valve more difficult or contaminate the water or other fluid flowing through the valve. On the other hand, when the plug member 22 is moved to the position shown in FIGURE 3 where the valve is closed, the O-ring 34 is in a position where it surrounds the inlet port 16 in the housing member 12 and thereby prevents the water under line pressure from the upstream side of the valve seeping about the valve plug 22 and out of drain 28 or into the downstream side of the line 20 and through the drain 30. By providing the sealing ring 34 in the groove 32 on the plug member 22 rather than in a groove in the valve seat about the inlet port 16, the line pressure maintains the sealing ring 32 in its groove and there is no tendency to blow the same out and cause pinching of the ring when the valve is moved from the open to the closed position and vice versa. Also, by providing the sealing ring as described, a single sealing ring may be utilized to seal both around the inlet port 16 of the housing member and the drain port 28 of the housing member 12 rather than requiring two separate sealing rings.

In order to reduce the friction of the plug member 22 when opening and closing the valve 10, a false port 36 is provided on the cylindrical surface 24 of the plug member 22, the false port surrounding the drain port 30. The false port 36 is of a diameter sufficiently great so as to surround the outlet port 18 when the plug member is moved to the closed position.

Plug member 22 is provided with a reduced portion outwardly beyond the valve seat and terminates in a flattened non-circular head 38 for engagement by a wrench (not shown), or by hand, in order to turn the plug member to open and close the valve. The other end of the plug member 22 extends outwardly beyond the valve seat 14 and is reduced to terminate in an annular flat end bearing surface 40 which cooperates with a similar annular flat bearing surface 42 provided on the interior of a conventional closure plug 44.

The plug member 22, as mentioned above, is a hollow shell and such shells have been heretofore cast from metal or molded from a rigid plastic material with the interior of the shell having a greater axial length than the port openings 26 and 27 so as to reduce the weight and cost of the plug member. However, difficulty has heretofore been encountered in the use of such hollow shells as plug members in rotary plug valves as turbulence resulted in the flow of liquid through the valve when the valve is in the open position, especially within the plug itself. To lessen turbulence within the valve 10, the hollow shell 22 is provided at each of its axial ends with opposed baffles 46. Preferably the baffles are made integral with the shell but they must lie in a plane transverse of an axis through the port openings 26 and 27 in the plug member 22. The opposed baffles 46 terminate from each other a distance at least as great as the diameter of the port openings 26 and 27 in the plug memebr 22 and thereby minimize break ups or eliminate eddies from the flow of liquid through the interior of the plug member.

The plug member 22 is provided with a pair of spaced circumferential grooves 48 of uniform depth on cylindrical surface 24, the grooves being positioned at opposite ends of the plug member. The grooves 48 receive O-rings 50 which cooperate with the valve seat 14 to prevent water or other fluid leaking outwardly between the valve seat 14 and plug member 22 when the plug member is in a position to open the valve. In essence, the valve shown in FIGURE 1 is pressure balanced, i.e., the cross sectional area of the plug exposed to fluid pressure in the line 20 in one direction axially is exactly the same as that exposed to line pressure tending to urge the plug member in an opposite axial direction because of this construction.

All parts of the valve 10 shown in FIGURES 1–4 with the exception of the O-rings 34 and 50 are presumably formed of metal but it will be appreciated by those skilled in the art such parts lend themselves to being formed of rigid synthetic plastic materials.

Referring now to FIGURES 5–9 inclusive of the drawings, there is shown a modified form of rotary plug valve 60 having a housing member 62 provided with a cylindrical valve seat 64 of uniform diameter and having diametrically opposite inlet and outlet ports 66 and 68, respectively. The valve 60 is of the type known in the trade as having a "closed-bottom" rotary plug valve which means that the valve seat 64 is provided with a closed integral part 70 formed on a sleeve like annular extension 72 of the housing member 62. The opposite end of the valve seat 64 in the housing member 62 is open for insertion of a plug member 74 which will be described in more detail later in the specification. A sleeve like cylindrical extension 76 providing the outer portion of the valve seat 64 is threaded as indicated at 78. This threaded end is known in the trade as a "Minneapolis top." In other words, the threads 78 are provided on the housing member 62 when it is desired to use the valve 60 with a curb box of the type having internal threads thereon, the curb box being threaded on the valve 60 when it is used as a curb stop. The inlet and outlet ports 66 and 68 of housing member 62 may be interiorly threaded to receive upstream and downstream sections of a water line 80.

The plug member 74 embodies two parts, namely, a hollow outer shell 82 having a cylindrical surface 84 for cooperating with the valve seat 64 and a plastic insert 86 fixedly supported within the outer shell. The hollow shell 82 has a closed inner end 88 and an open end 90 for receiving the plastic insert 86. Additionally, the shell 82 has an inlet port opening 92 and an outlet port opening 94, both of which are elongated in an axial direction of the plug member 74. By making the inlet and outlet port openings 92 and 94 elongated as well as making the inlet and outlet ports 66 and 68 of the housing member elongated and complementary to the port openings 92 and 94 at their opening to the seat surface, the opening through the plug member 74 can have a cross-sectional area only slightly smaller than the cross-sectional area of the water line 80 without the plug being of too great a diameter.

The plastic insert element 86 is substantially cylindrical in the portion within the hollow shell 82 and has its outer end flattened as indicated at 96 and best shown in FIGURES 5 and 7. A pin 98 extending radially through a hole in the shell 82 and into the lower portion 96 of the plastic insert element 86 fixedly retains the plastic insert element within the shell for movement as a unit therewith. The plastic insert element 86 has a passageway 100 extending therethrough and registering with the port openings 92 and 94 in the shell, the passageway 100 being elongated and complementary in cross-sectional shape to the port openings 92 and 94. The port openings 92 and 94 in the passageway 100 define a flow passage through the plug member 74 and by the construction just described it will be appreciated that the flow passage through the plug is uninterrupted and smooth so as to provide a smooth flow without turbulence or eddies through the valve when the valve is open. By utilizing a plug of this construction there is considerable savings in material used, weight size and cost of manufacture as the shell 82 can be easily cast or molded, there being no problems in assembly of the plug from the plastic insert and the shell. Additionally, a plug of this type operates as efficiently in a rotary plug valve as plugs of more expensive construction.

Since the rotary plug valve 60 disclosed in FIGURE 5 is of the "closed-bottom" type and there is a space provided between the interior surface of the part 70 and the inner end of the plug member 74, the valve is an unbalanced valve, i.e., when the valve is open, the line pressure will act on the end of the plug member 74 tending to urge the same axially out of the valve seat 64 in the housing member 62. There is no necessity of making this valve a balanced valve by providing sealing rings on each end of the plug, as disclosed in the aforementioned patent because of the construction described below. In order to retain the plug member within the housing member 62 means are provided to prevent the plug member from moving axially outwardly of the housing member, the means also functioning to provide a seal to prevent the ingress of surface water, grit and other abrasive materials between the valve seat and the plug member. In more detail, the plug member 74 is provided with a circumferential groove member 102 adjacent the outer end of the same, the circumferential groove being of uniform depth and receiving an O-ring 104. The O-ring 104 which acts against the valve seat 64 prevents the escape of water from within the valve outwardly of the same. The upper end of the valve plug member 74 is reduced as indicated at 106 to provide an outwardly facing shoulder 108 (FIGURE 9). The shoulder 108 is arranged to snugly seat an anti-friction or thrust washer 110, made of nylon or other suitable material, the washer having an outer bevelled edge which seats against an inclined outwardly, diverging conical surface 112 in the upper end of the valve seat 64. Immediately above the inclined outwardly diverging conical surface 112, there is provided an annular groove 114 in the seat surface, the groove 114 being arranged to receive a split lock ring 115 that overlies a portion of the anti-friction washer 110. It will now be understood that when the valve 60 is open and line pressure is acting against the bottom of the plug member 74 and urging the same axially outwardly, the plug member 74 is urged snugly against the anti-friction washer 110 which provides a seal to prevent seepage of muddy water containing grit and other abrasive material past the anti-friction washer which could possibly engage the O-ring 104 and cause wear thereof. Also, it will be understood by the construction just described that the bevelled surface 112 permits the assembly of the plug member 74 with the O-ring 104 thereon into the valve seat 64 without the danger of the O-ring being damaged when it is moving past the snap ring groove 114 as would be the case if the valve seat 64 was a constant diameter at this point.

The housing member 62 is provided with a drain port 116 intermediate its inlet and outlet ports 66 and 68, respectively. The drain port 116 is arranged to register with the flow passage through the plug member 74 defined by the port openings 92 and 94 and passageway 100 when the valve is closed. Also, it will be noted that the radial drain port 116 is surrounded at its inner end by a shallow recess 118 in the wall of the valve seat 64, the shallow recess 118 merging smoothly into the inner wall of the valve seat. The shallow recess is elongated in a direction toward the inlet port 66 of the housing member 62. The functions of the recess 118 will be described later in the specification. Plug member 74 is provided with a drain passage defined by registering radial drain ports 120 and 122 in the shell 82 and plastic insert 86, respectively.

Referring now to FIGURES 5 and 6, it will be noted that the interior wall of the shell 82 is provided with a longitudinally extending groove 124 which passes between the registering drain ports 120 and 122 and communicates with the space 128 between the inner end of the plastic insert 86 and the closed inner end 88 of the shell 82. Also, the groove 124 communicates with the space 130 between the inner or bottom end of the plug member 74 and the inner surface of the closed-bottom part 70 of housing member 62.

As described above with respect to the valve 10, illustrated in FIGURES 1-4, the valve 60 operates substantially similar when draining the downstream section of the line 80. When the valve is in the closed position as shown in FIGURE 6, the drain port 116 in the housing member 62 registers with the flow passage through the plug member 74 and the drain ports 120 and 122 register with the outlet port 68 in the housing member 62. Thus, water can drain from the downstream side of the line 80 through the ports 120 and 122 to the flow passageway in the plug member and out of the port 116 in the housing member 62. An endless groove 132 (FIGURE 9) of uniform depth is provided on the cylindrical surface 84 of the shell 82 of the plug member 74. The groove 132 is on an opposite side of the shell from the drain port 120 and is arranged to receive an O-ring 134 which functions identically with the O-ring 48 previously described with respect to the valve 10 of FIGURES 1-4. Additionally, a false port 136 is arranged concentrically within the groove 132, the false port 136 having a diameter sufficient to overlap at least a portion of the inlet port 66 and the inlet side of the recess 118 of drain port 116 when the plug member is being moved from the closed position to the open position of the valve. This permits water at line pressure to be momentarily exposed to the drain port 116 and thus serves to flush and blow out any debris such as dirt or mud which may have been packed into this port when the valve has been in the closed position for any length of time. Also, at this time it will be noted that the recess 118 additionally functions to minimize possible damage to the O-ring 134 as the latter passes across the drain port 116 because it recesses the opening of the drain port away from the seat.

When the plug member 74 is being moved from the closed position as shown in FIGURE 6 to an open position and as soon as the flow passage in the plug member begins to register with the inlet port 66 in the housing member, there is line pressure exerted through the flow passage in the plug member. Since the plastic insert 86 is relatively thin walled as illustrated in FIGURE 5 and has a portion of this wall spaced from the inner end 88 of the shell 82, it is necessary that the pressure to which the passageway 100 is subjected be equalized and this is accomplished by the provision of the aforedescribed longitudinal groove 124 in the inner wall of the shell 82. It will now be understood that line pressure will pass through the port 122 and will subject the outside of the plastic insert 86 and more specifically the ends of the plastic insert to line pressure so as to equalize the pressure on the inside and outside of the insert to prevent the same from bursting. Also, the arrangement just described functions to assist the line pressure in acting on the inner end of the shell and the plastic insert in such a way as to urge the plug member axially outwardly. The anti-friction washer 112 then acts as a seal because of its tight engagement with the shoulder 110 of the shell and conical surface 112 of the valve seat 64 as it is restrained by the snap ring and, thus, there can be no seepage inwardly of muddy water with grit or other abrasive material which might damage the O-ring 104 or for that matter the O-ring 134.

Referring now specifically to FIGURES 5 and 7, it will be noted that the lower end of the valve seat 64 is reduced as indicated at 138 for receiving the reduced end 140 of the plug member 74. The reduced portion 138 is provided with circumferentially spaced plane surfaces 142 and 144, the surfaces 142 and 144 having an enlarged portion 148 therebetween. The reduced end 140 of the plug member 74 is provided with a radial projection or lug 150 having flat surfaces 152 and 154 thereon arranged to cooperate respectively with the plane surfaces 142 and 144 so that such surfaces act as stops or checks to limit rotational movement of the valve plug member to 90° in moving the same to open and closed positions. Since the flat surfaces 152 and 154 are at 90° with respect to one another and since the flat or plane surfaces 142 and 144 are parallel to one another, it will be appreciated that when assembling the plug member 74 within the valve housing member 62, the plug member can only be inserted in the proper quadrant.

Referring now to FIGURES 10-16 inclusive, there is illustrated a further preferred modified form of rotary plug valve 160 having a housing member 162 provided with a cylindrical valve seat 164 of uniform diameter. The housing member 162 is provided with diametrically opposite inlet and outlet ports 166 and 168, respectively, for connection to upstream and downstream water lines. The plug valve 160 is quite similar to that disclosed and described with respect to FIGURE 5 in that it is a "closed bottom" type rotary plug valve, the housing member 162 of the same being provided with a closed integral part 170 formed on a sleeve like annular extension 172. The housing member 162 differs from the housing member 62 of FIGURE 5 in that the closed integral part 170 and the annular extension 172 of the housing member 162 is provided with check lug contacting surfaces 174 and 176 lying in true radial planes through the longitudinal axis of the cylindrical valve seat 164. By having the lug contacting surfaces so arranged, the housing member 162 may be conveniently and inexpensively molded or cast as the contacting surfaces 174 and 176 can be formed by coring only without the combination of green sand and cores. This eliminates all fins and burs within the check lug area of the housing member 162 and consequently accurate check lug contacting surfaces 174 and 176 can be obtained without the additional work or cost of actual machining. The check lug of the plug member of valve 160 which cooperates with the surfaces 174 and 176 to limit the rotational movement of the plug member will be described in more detail later in the specification.

The end portion of the valve seat 164 opposite the end closed by the bottom part 170 is open for insertion of a plug member 178 which is generally similar to the plug member 74 of FIGURES 5–9. The plug member 178 embodies two parts, namely, a hollow outer shell 180 having a cylindrical seating surface 182 for cooperating with the valve seat 164 and a plastic insert 184 fixedly supported within the outer shell. The outer shell 180 which is provided with the usual turning key 186 at its upper end is closed as indicated at 188 and open as indicated at 190. The open end 190 of hollow outer shell 180 is arranged to fixedly receive the plastic insert 184 as will be described in more detail later in the specification.

Shell 180 is provided with an inlet port opening 192 and an oppositely disposed and axially aligned outlet port opening 194, both of which are elongated in the axial direction of the plug member 178. Additionally, the shell 180 is provided with an annular groove 198 for receiving a sealing ring 200 such as an O-ring. The groove 198 and O-ring 200 of plug valve 160 function in an identical manner to the groove 132 and O-ring 134 of the embodiment disclosed in FIGURES 5–9, inclusive, and therefore, a detailed description of the same will not be repeated herein.

The upper end portion of the shell 180 and the upper end portion of the cylindrical valve seat 164 are identical in construction to that disclosed in FIGURES 5–9 in that an O-ring 202 is provided in a groove extending about the shell and an anti-friction thrust washer 204 is provided between the shell and the housing member 162 outwardly of the O-ring 202. The thrust or anti-friction washer 204 bears against a split lock ring 206 which retains the plug member 178 in the housing member 162. The thrust washer 204 functions as a seal when vertical thrust created by internal pressure on the valve causes the plug member 178 to tend to move in an outwardly direction. Thus, the thrust washer 204 prevents external dirt and muddy water from getting into and between the critical movable parts of the valve and from damaging the O-rings 200 and 202.

The hollow interior of the shell 180 is molded or cast with a longitudinally extending groove 208 in a portion thereof intermediate the inlet and outlet port openings 192 and 194 on the side thereof opposite the side having the sealing ring 200. A drain port 209 is also provided in the wall of the shell 180, the drain port 209 communicating interiorly with the longitudinally extending interior groove 208.

The lower end of the shell 180 is provided with a downwardly extending arcuate check lug 210 having surfaces 212 and 214 lying in true radial planes extending through the axis of the shell. The check lug 210 has a circumferential length substantially less than the circumferential length between the surfaces 174 and 176 of the housing member 162 so that when the shell 180 is inserted into the housing member 162, it can be inserted in only one quadrant and the rotation of the same relative to the housing member 162 will be limited to 90°, moving the plug member 178 between opened and closed positions. By having the check lug 210 integrally formed on the end of the shell 180 as described above, the shell may be molded or cast without any machining operations as the lug 210 is formed by coring alone thus eliminating making the same from a combination of green sand and cores. Just as in the case of the housing member 162 the molding or casting of the check lug 210 in this manner enables the same to have accurate contacting surfaces 212 and 214 without the necessity of additional machining to remove burs or fins.

The plastic insert 184 is substantially identical with the plastic insert 86 of FIGURES 5–9 with the exception that it is provided with a radially extending arcuate flange or fin 216 at it slower end. The flange or fin 216 has a circumferential length equal to the circumferential distance between the surfaces 212 and 214 of the check lug 210 and, thus, when the plastic insert is inserted into the hollow shell 180, it can only be inserted in one direction as the surfaces 218 and 220 of the flange or fin 216 must mate with the surfaces 212 and 214 on the check lug 162. By such an arrangement, the plastic insert 184 may be fixedly retained within the hollow shell 180 so that its passageway 221 is in perfect alignment with the ports 192 and 194 of the shell 190 at all times and thus forms an uninterrupted pasasgeway through the plug member. A pin is not necessary in this arrangement when making the plug member 178. The plastic insert 184 is provided with a port 222 which functions the same as the port 120 in the insert 86 of FIGURES 5–9, the port 222 being aligned with the port 209 of the shell 180.

The plug valve 160 of FIGURES 11–16 functions slightly different from the plug valve 60 as the longitudinal groove 208 in the shell 180 is closed at its lower end. In the environment of FIGURES 10–16, the valve when initially opened has fluid under line pressure flow to the area above the insert through the passageway 208 but the fluid flows to the area beneath the insert between the exterior wall of the shell 180 and the valve seat 164 of housing member 162. In any event, the pressure on either end of the insert 184 is immediately equalized with the line pressure flowing through the insert 184 when the valve is initially opened and this prevents bursting of the end walls of the insert.

It will be noted that a shallow recess 224 is provided about the drain port 226 in the inner wall of the housing member 62. The recess 224 cooperates with the O-ring 200 in a manner similar to that previously described and pressure flushing occurs even though there is no false port centrally of the O-ring because of line pressure and "blow down" about the plug member.

In each of the rotary plug valves described above, namely, the valve 10 of FIGURE 1, the valve 60 of FIGURE 5, and the valve 160 of FIGURE 10, the O-ring carried on the exterior surface of the plug member cooperates with the inlet seat port of the valve as well as the external drain port of the valve. When the valves are in the open position for flow therethrough, the O-ring on the plug member of the respective valve surrounds the external drain port on the housing member and prevents any mud, debris or exterior surface water from entering into the interior of the valve. On the other hand, when the valve is closed and the drain port is opened to drain the downstream line, the O-ring surrounds the inlet seat port and line pressure of water in the inlet line functions to hold the O-ring tightly in its groove, especially during actual closing and opening of the valve.

Additionally, the arrangement of the O-ring on the valve plug so that it surrounds the drain port in the housing member when the valve is in the open position provides for an improved sealing effect of the O-ring as there is a differential pressure across the O-ring. Line pressure surrounds the O-ring whereas only atmospheric pressure is on the inside of the O-ring and thus the differential pressure resulting distorts the O-ring in its groove to improve its sealing qualities.

In the valve arrangements of FIGURES 5 and 10, the valve plug member in each instance includes a plastic insert within a hollow shell so that there is an uninterrupted passage through the valve plug member between the inlet seat port and outlet seat port of the housing member when the valve is in the open position. This arrangement reduces the pressure loss across the valve as in the case of a valve merely having a hollow plug member. Of course, the provisions of the baffles in the plug member of the arrangement disclosed in FIGURE 1 to some extent reduce the pressure loss characteristics as it tends to cut down on eddies within the plug member.

The valve structure heretofore described and illustrated in the drawings fully and effectively accomplishes the objects and advantages of the invention. It will be realized, however, that the foregoing specific embodiments have been shown and described only for the purposes of illustrating the principles of this invention and are subject to some changes without departing from such principles. Therefore, the terminology used in the specification is for the purpose of description and not limitation, the spirit and scope of the invention being defined in the claims.

What is claimed is:

1. A rotary plug valve comprising: a housing member having a cylindrical valve seat provided with an inlet port and a diametrically opposed outlet port; a cylindrical plug member rotatable in said valve seat and having a flow passage therethrough with port openings at each end thereof; means to limit rotation of said plug member between two positions, a first position where said valve is open and said flow passage is in registration with the ports in said housing member, a second position where said valve is closed and said flow passage is out of registration with the ports, said plug member having a drain passage therein communicating with the flow passage intermediate its port opening and arranged to align with the outlet port of said housing member when said plug member is moved to said second position; said housing member having a drain port therein extending from the exterior thereof to said valve seat, said valve seat further being provided with a shallow recess surrounding the inner end of the drain port in said housing member, said recess merging smoothly with said seat, said drain port in said housing member being aligned with the flow passage in said plug member when the plug member is moved to said second position; means defining an endless groove on the exterior surface of said plug member between the port openings of the same; a resilient sealing ring in said groove of said plug member, said sealing ring and groove being arranged on the surface of said plug member opposite the side of the plug member having the drain port therein so that said sealing ring surrounds said inlet port of the housing member when said plug member is moved to said second position to close the valve and surrounds the drain port in said housing member when said plug member is moved to said first position to open said valve.

2. A rotary plug valve as claimed in claim 1 in which said plug member includes a false port on its surface surrounding the drain port therein, the false port surrounding the outlet port of said housing member when said plug member is moved to close the valve.

3. A rotary plug valve comprising: a housing member having a cylindrical valve seat provided with an inlet port and a diametrically opposed outlet port, said housing member having a closed bottom; a cylindrical plug member rotatable in said valve seat, and having a flow passage therethrough with port openings at each end thereof, said flow passage being movable into and out of registration with the ports in said housing member to open and close the valve, said plug member further having a drain passage therein communicating with the flow passage intermediate its port openings and arranged to align with the outlet port of said housing member when said plug member is moved to close the valve, said housing member having a drain port therein extending from the exterior thereof to said valve seat and being arranged to align with the flow passage in said plug member when the plug member is moved to close the valve, said plug member comprising a hollow shell opened at one end thereof and a plastic insert fixedly retained within the shell of said plug member, said shell having diametrically opposed openings therein defining the port openings at each end of the flow passage of the plug member, and said plastic insert having a passageway therethrough aligned with the openings in said shell and forming a part of the flow passage in said plug member, said shell having a drain port therein intermediate its opposed openings thereof and said plastic insert further having a drain port therein communicating with the passageway in the insert and registering with the drain port in said shell whereby the drain port in said shell and the drain port in said passage define the drain passage in said plug member.

4. A rotary plug valve as claimed in claim 3 in which the inlet and outlet ports of the housing member are vertically elongated at least at the valve seat and in which said flow passage through said plug member and plastic insert is vertically elongated.

5. A rotary plug valve as claimed in claim 3 in which said plastic insert is fixedly retained in said shell by a pin extending radially through said shell and into said plug.

6. A rotary plug valve as claimed in claim 3 in which said shell and said plastic insert therein have a space therebetween at the upper end thereof and in which said shell has a longitudinally extending groove on its inner wall communicating with said space and with a space between the plug member and the closed-bottom of said housing member, said longitudinal groove being intermediate the registering drain ports in said plug member and said plastic insert.

7. A rotary plug valve as defined in claim 1 in which said plug member includes a false port in its exterior surface arranged to surround the inlet port of said housing member when the valve is closed, said false port being concentric within the endless groove and sealing ring on said plug member and having a diameter great enough to overlap at least a portion of the inlet port of said housing member and the inlet side of the recess in the valve seat when the plug member is being moved from open to closed position so that the drain port in the housing member is momentarily exposed to inlet line pressure.

8. A rotary plug valve comprising: a housing member having a cylindrical valve seat provided with an inlet port and a diametrically opposed outlet port, said housing member having opening at one end of the valve seat and having an integral closed-bottom at the other end of the valve seat; a cylindrical plug member rotatable in said valve seat, said cylindrical plug member comprising a hollow shell closed at one end and open at the opposite end thereof and a separate plastic insert positioned within the hollow shell, means fixedly retaining said plastic insert to said hollow shell whereby said shell and said plastic insert rotate as a unit, said shell and said plastic insert having a flow passage therethrough arranged to be aligned with the inlet and outlet ports of said housing member when said plug member is in one position and out of registration with the ports in said housing member when said plug member is rotated to a second position, said flow passage through the shell and the plastic insert having a shape substantially complementary to the shape of the inlet and outlet ports in said housing member respectively; means to provide a seal between said plug member and said valve seat adjacent the opening in said housing member; and means to retain said plug member against axial movement relative said housing member.

9. A rotary plug valve as claimed in claim 8 in which said inlet and outlet ports of said housing member are elongated at least adjacent the opening into said valve seat and wherein said flow passage in said shell and plastic inserts is also elongated, the elongation of said ports in the housing member and the flow passage through said plug member being in a direction axially of said plug member.

10. A rotary plug valve as claimed in claim 8 in which said plastic insert and said shell at its closed end has a space therebetween and in which said plug member and the closed bottom of the housing member have a space therebetween, and means in said plug member for applying line pressure to said space when said valve is moved from the closed to the open position.

11. A rotary plug valve as claimed in claim 10 in which said last-mentioned means includes a passageway between said shell and said plastic insert, said last-mentioned passageway having one end thereof communicating with the space between the plastic insert and the closed end of said shell and the other end thereof communicating with the space between the plug member and the closed bottom of said housing member, and a port in said plastic insert communicating with the interior of the flow passage therein intermediate its end and with said last-mentioned passageway.

12. A rotary plug valve as claimed in claim 11 in which said passageway between said shell and said plastic insert is defined by a longitudinally extending groove in the interior wall of said hollow shell.

13. A rotary plug valve as claimed in claim 10 in which said means to provide a seal between said plug member and said valve seat includes a circumferential groove on the outer surface of the shell of said plug member and a resilient sealing ring in said groove, and in which said means to retain said plug member against axial movement relative said housing member includes a reduced portion on the shell of said plug member outwardly of the circumferential groove and defining an upwardly facing shoulder, an inclined outwardly diverging conical surface in the valve seat adjacent the opening of said housing member, an annular groove at the outer end of said conical surface, an anti-friction washer seated against said outwardly facing shoulder and having an outer bevelled edge corresponding to said diverging conical surface in the valve seat, and a snap ring positioned in said annular groove and overlapping a portion of said anti-friction washer.

14. A rotary plug valve as claimed in claim 13 wherein said anti-friction washer is made of a low friction plastic material.

15. A rotary plug valve comprising: a housing member having a cylindrical valve seat provided with an inlet port and a diametrically opposed outlet port; said housing member having an opening at one end of the valve seat and an integrally closed bottom at the other end of the valve seat; a cylindrical plug member rotatable in said valve seat and having a flow passage therethrough with port openings at each end thereof, said flow passage being movable into and out of registration with the ports in said housing member to open and close the valve, said plug member having one end extending out of the opening in said housing member and the other end spaced from the closed bottom of said housing member; means to provide a seal between said plug member and the valve seat inwardly of the opening in said housing member; sealing means to retain said plug member against axial movement relative said housing member and to provide a seal against ingress of fluids and abrasive material from without said housing member, said last-mentioned sealing means being positioned outwardly of said first-mentioned means and including a circumferential groove on the outer surface of the plug member and a sealing ring carried in said groove and cooperating with said valve seat and in which said means to retain said plug member against axial movement relative said housing member includes a reduced portion on said plug member outwardly of the circumferential groove and defining an outwardly facing shoulder, an inclined outwardly diverging conical surface in the valve seat adjacent the opening of said housing member and extending from a position adjacent said shoulder when said plug member is in said housing member, an annular groove in said valve seat at the outer end of said conical surface, an anti-friction sealing washer seated against said outwardly facing shoulder and having an outer bevelled edge corresponding to and seating against said diverging conical surface of said valve seat, and a snap ring positioned in said annular groove of said valve seat and overlapping a portion of said anti-friction sealing washer; and means for applying line pressure to the space between said plug member and the closed-bottom of said housing member when said valve is open.

16. A rotary plug valve as claimed in claim 15 wherein said means to apply line pressure to the space between the end of said plug and the closed bottom of said housing member includes a passageway in said plug member having one end opening to the first-mentioned passageway in said plug member and the other end opening to the space between the end of said plug member and the closed bottom of said housing member.

17. A rotary plug valve comprising: a housing member having a cylindrical valve seat provided with an inlet port and a diametrically opposed outlet port, said housing member having an opening at one end of the valve seat and an integrally closed-bottom at the other end of the valve seat; a cylindrical plug member rotatable in said valve seat to open and close the valve, said cylindrical plug member comprising a hollow cast shell closed at one end and open at the opposite end thereof and a plastic insert fixedly retained within the hollow shell and having its inner end spaced from the closed end of the shell, said shell and said plastic insert having an uninterrupted flow passage therethrough arranged to be aligned with the inlet and outlet ports of said housing member when said plug member is rotated to one position and out of registration with the ports in said housing member when said plug member is rotated to a second position, said plastic insert having a thin wall at its inner end; and means to apply line pressure to the exterior surface of the inner end of said plastic insert when said valve is moved from closed to open position to thereby prevent said inner end from bursting.

18. A rotary plug valve as claimed in claim 17 in which said last-mentioned means includes a passageway in said plug member having an opening at one end thereof to the portion of the uninterrupted passageway in said plastic insert and open at the other end to the space between the closed end of the shell and the inner end of the plastic insert.

19. A rotary plug valve as claimed in claim 18 in which said plug member has its inner end spaced from the closed-bottom of said housing member, and in which said passageway in said plug member also has an opening to the space between the inner end of said plug member and the closed bottom of said housing member.

20. A rotary plug valve comprising: a housing member having a cylindrical valve seat provided with an inlet port and a diametrically opposed outlet port, said housing member having an opening at one end of said valve seat and a closed-bottom at the other end of said valve seat; a cylindrical plug member rotatable in said valve seat and having a flow passage therethrough with port openings at each end thereof, said flow passage being movable into and out of registration with the ports in said housing member to open and close the valve; means to provide a seal between said plug member and the valve seat inwardly of the opening in said housing member, said sealing means including a circumferential groove on the outer surface of the plug member and a sealing ring carried in said groove and cooperating with said valve seat; means to retain said plug member against axial movement relative said housing member and to provide a seal against ingress of fluids and abrasive material from without said housing member, said last-mentioned means being positioned outwardly of said first-mentioned means, and including a reduced portion on said plug member outwardly of the circumferential groove and defining an outwardly facing shoulder, an inclined outwardly diverging conical surface in the valve seat adjacent the opening of said housing member and extending from a position adjacent said shoulder when said plug member is in said housing member, an annular groove in said valve seat at the outer end of said conical surface, an anti-friction sealing washer seated against said outwardly facing shoulder and having an outer bevelled edge corresponding to and seating against said diverging conical surface of said valve surface, and a snap ring positioned in said annular groove of said valve seat and overlapping a portion of said anti-friction sealing washer.

21. A rotary plug valve comprising: a housing member having a cylindrical vave seat provided with an inlet port and a diametrically opposed outlet port; a plug member retained in and rotatable with respect to said valve seat, said plug member comprising a hollow cast shell having an outer surface cooperating with said valve seat and a separate plastic insert within the hollow shell, means fixedly retaining said plastic insert to said hollow shell whereby they rotate as a unit, said shell and said plastic insert having an uninterrupted flow passage therethrough arranged to be aligned with the inlet and outlet ports of said housing member when said plug member is in one position and out of registration with the ports in said housing member when said plug member is rotated to a second position.

22. A rotary plug valve comprising a housing member having a cylindrical valve seat provided with an inlet port and a diametrically opposed outlet port; a cylindrical plug member rotatable in said valve seat and having a flow passage therethrough movable into and out of registration with said ports to open and close the valve, said plug member comprising a hollow cast shell open at one end and closed at the opposite end thereof and a plastic insert fixedly retained within the hollow shell, the flow passage in said plug member being defined by oppositely disposed ports in said shell and a passageway through said plastic insert aligned with the ports in said shell, a drain port in said shell and a drain port in said plastic insert registering therewith and defining a drain passage in said plug member, said drain passage in said plug member being arranged to be aligned with the outlet port in said housing member when said valve is closed, said housing member having a drain port therein extending from the exterior thereof to said valve seat, said drain port in said housing member being aligned with the flow passage in said plug member when the plug member is moved to close the valve; said plug member having an endless groove on the exterior surface thereof between the diametrically opposed ports of said shell; a resilient sealing ring in said groove of said plug member, said sealing ring and groove being arranged on the surface of said plug member opposite to the side of the plug member having the drain passage therein so that the sealing ring surrounds the inlet port of the housing member when the plug member is moved to close the valve and surrounds the drain port in said housing member when the plug member is moved to open said valve.

23. A rotary plug valve as claimed in claim 22 in which said plastic insert has its inner end spaced from the closed end of said shell, said shell having a longitudinal groove on the inner wall thereof communicating with the drain ports in the plastic insert and the shell, said longitudinal groove also communicating with the space between the inner end of the plastic insert and the closed end of the shell.

24. A rotary plug valve as claimed in claim 23 in which said housing member has a closed bottom at one end of said valve seat spaced from the inner end of said plug member, and means to seal the outer end of said plug member with said valve seat and retain said plug member against axial movement outwardly of said housing member, and in which said longitudinal groove in said shell communicates with the space between the inner end of said plug member and the closed-bottom of said housing member.

25. A rotary plug valve as claimed in claim 22 in which said housing member has a closed-bottom at one end of said valve seat spaced from the end of said plug member, said valve seat being reduced adjacent said closed-bottom and provided with circumferentially spaced plane surfaces, said plug member having its end reduced and provided with a radial projection having plane surfaces thereon for respective engagement with the plane surfaces of said valve seat to limit rotational movement of the plug member to opened and closed positions and enable the plug member to be inserted in one quadrant.

26. A rotary plug valve as claimed in claim 22 in which said valve seat is provided with a shallow recess surrounding the inner end of the drain port in said housing member, said recess merging smoothly with said valve seat.

27. A rotary plug valve as claimed in claim 26 in which said plug member includes a false port in its exterior surface arranged interiorly of the endless groove and sealing ring of said plug member, said false port having a diameter great enough to overlap at least a portion of the inlet port of said housing member and the inlet side of the recess in the valve seat when the plug member is being moved from open to closed position so that the drain port in the housing member is momentarily exposed to inlet line pressure.

28. A rotary plug valve comprising: a housing member having a cylindrical valve seat provided with an inlet port and a diametrically opposed outlet port, said housing member having an opening at one end of the valve seat and an integrally closed bottom at the other end of the valve seat; a cylindrical plug member rotatable in said valve seat to open and close the valve, said cylindrical plug member comprising a hollow shell closed at one end and opened at the opposite end thereof and a plastic insert fixedly retained within the hollow shell and having its inner end spaced from the closed end of the shell, said shell and said plastic insert having a substantially uninterrupted flow passage therethrough arranged to be aligned with the inlet and outlet ports of said housing member when said plug member is rotated to one position and out of registration with the ports in said housing member when said plug member is rotated to a second position, said plastic insert having its outer end relative said hollow shell spaced from said integrally closed bottom of said housing member when said plug member is positioned in said valve seat; and means to apply line pressure to the exterior surface of both the inner and outer ends of said plastic insert when said valve is moved from closed to opened position to thereby prevent the ends of the insert from bursting.

29. A rotary plug valve as claimed in claim 28 in which said last-mentioned means includes a passageway in said plug member having an opening at one end thereof to a portion of the uninterrupted passageway in said plastic insert and further open at each of its ends respectively to the space between the closed end of the shell and the inner end of the plastic insert and the space between the closed bottom of the housing member and the outer end of the plastic insert.

30. A rotary plug valve as claimed in claim 28 in which said last-mentioned means includes a passageway in said plug member having an opening at one end thereof to the portion of the uninterrupted passageway in said plastic insert and open at the other end to the space between the closed end of the shell and the inner end of the plastic insert and a passage between the exterior surface of the shell and the housing member extending at least from the inlet port of the housing member to the space between the closed bottom of the housing member and the outer end of the plastic insert.

31. A rotary plug valve as claimed in claim 28 in which the closed bottom of the housing member is provided with circumferentially spaced check lug contacting surfaces, said surfaces lying in planes radial of the axis of the valves seat, and in which said plug member includes a check lug extending downwardly from the inner end of said shell, said check lug having contacting surfaces thereon lying in planes extending radially of the axis of the plug member, said check lug having a circumferential length less than the circumferential length between the check lug contacting surfaces of said housing member whereby said plug member is limited in rotational movement to opened and closed positions.

32. A rotary plug valve as claimed in claim 31 in which said plastic insert at one end thereof has a radially extending flange having a circumferential length equal to the circumferential length between the surfaces of said check lug whereby said flange mates between said surfaces and thus provides alignment of the plastic insert relative the hollow shell.

33. A rotary plug valve as claimed in claim 32 in which said means for applying line pressure to the exterior surface of the ends of said plastic insert includes a passageway in said plug member having an opening to the uninterrupted passageway in said plastic insert and an opening to the space between the closed end of the shell and the inner end of the plastic insert and a passageway between the exterior surface of said shell and said housing member extending at least from the inlet port of said housing member to the space between the closed bottom of said housing member and said plastic insert.

34. A rotary plug valve as claimed in claim 28 in which said plug member has an endless groove on its exterior surface between port openings of the uninterrupted flow passage therethrough, a resilient sealing ring in said groove, a drain port in said housing member extending from the exterior thereof to said valve seat, a drain port in said plug member defining a drain passage extending from the uninterrupted passage thereof to the exterior thereof, said plug member being movable from an open position to a closed position where said sealing ring surrounds the inlet port of said housing member and where said drain passage in said plug member is aligned with the outlet port in said housing member, said plug member when in the open position being arranged to have the sealing ring in said plug member surround said drain port in said housing member whereby differential pressure caused by line pressure surrounding said O-ring and atmospheric pressure on the inside of said O-ring distorts the O-ring and improves its sealing qualities.

35. A rotary plug valve as claimed in claim 34 in which said plug member includes a false port on its exterior surface arranged interiorly of the endless groove and sealing ring of said plug member, said false port having a diameter sufficient to overlap at least a portion of the inlet port of said housing member and the drain port in said housing member to momentarily expose said drain port to full line pressure as said plug member is being moved from opened to closed position whereby said drain port in said housing member is vigorously flushed of any accumulated foreign material.

36. A rotary plug valve comprising: a housing member having a cylindrical valve seat provided with an inlet port and a diametrically opposed outlet port; and a cylindrical plug member rotatable in said valve seat and having a flow passage therethrough with port openings at each end thereof, said flow passage being movable into and out of registration with the ports in said housing member to respectively open and close the valve, said plug member being a hollow shell provided with said opposed port openings in the wall thereof and in which the flow passage therethrough is defined by the interior of the shell and the opposed port openings thereof, the interior of said hollow shell having opposed baffles therein extending axially of the plug member and lying in a plane transverse of an axis through the port openings in the plug member, said opposed baffles terminating from each other a distance at least as great as the diameter of the ports in said plug whereby turbulence is reduced in the flow of fluid through the interior of said plug.

References Cited

UNITED STATES PATENTS

| | | | |
|---|---|---|---|
| 234,377 | 11/1880 | Fetterly et al. | 251—292 X |
| 713,052 | 11/1902 | Bordo et al. | 137—375 X |
| 1,398,329 | 11/1921 | King | 137—625.22 X |
| 1,624,512 | 4/1927 | Shipley | 251—287 X |
| 2,182,930 | 12/1939 | Nordstrom | 251—288 |
| 2,967,539 | 1/1961 | Bradbury | 137—383 X |
| 3,073,336 | 1/1963 | Johnson | 137—375 |
| 3,168,280 | 2/1965 | Mueller | 251—286 X |
| 3,232,579 | 2/1966 | Jeffrey | 251—312 |
| 3,254,872 | 6/1966 | Roos | 251—312 X |

FOREIGN PATENTS

| | | |
|---|---|---|
| 564,173 | 3/1923 | France. |
| 1,090,278 | 12/1953 | France. |

M. CARY NELSON, *Primary Examiner.*

R. J. MILLER, *Assistant Examiner.*